US006338891B1

(12) United States Patent
Kawasaki et al.

(10) Patent No.: US 6,338,891 B1
(45) Date of Patent: Jan. 15, 2002

(54) INK JET RECORDING SHEET

(75) Inventors: Katsuhiko Kawasaki; Tetsuya Uto; Mitsuhiro Ikeda, all of Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 09/119,775

(22) Filed: Jul. 21, 1998

(30) Foreign Application Priority Data

Jul. 23, 1997 (JP) .......................................... 9-197296
Jul. 29, 1997 (JP) .......................................... 9-202869

(51) Int. Cl.[7] .......................... B32B 3/00; B32B 3/26
(52) U.S. Cl. ................ 428/195; 427/372.2; 428/304.4
(58) Field of Search ............................ 428/206, 212, 428/220, 318.4, 331, 195, 304.4; 427/372.2

(56) References Cited

U.S. PATENT DOCUMENTS

| | | | | |
|---|---|---|---|---|
| 4,555,394 A | | 11/1985 | Asaoka et al. | |
| 5,691,046 A | * | 11/1997 | Matsubara et al. | 428/310.5 |
| 5,707,716 A | * | 1/1998 | Yoshino et al. | 428/212 |
| 5,723,211 A | | 3/1998 | Romano et al. | |

FOREIGN PATENT DOCUMENTS

| | | | | |
|---|---|---|---|---|
| EP | 0407720 A1 | | 1/1991 | |
| EP | 0524626 A1 | | 1/1993 | |
| EP | 0691210 A1 | | 1/1996 | |
| EP | 0742108 A1 | | 11/1996 | |
| JP | 06-297831 | * | 10/1994 | B41M/5/00 |
| JP | 7-179026 | | 7/1995 | |
| JP | 7-232473 | | 9/1995 | |
| JP | 9-30115 | | 2/1997 | |
| JP | 10-44584 | | 2/1998 | |

* cited by examiner

*Primary Examiner*—Bruce H. Hess
*Assistant Examiner*—Michael E. Grendzynski
(74) *Attorney, Agent, or Firm*—Armstrong, Westerman, Hattori, McLeland & Naughton LLP

(57) ABSTRACT

The present invention provides an ink jet recording sheet excellent in ink absorption properties, surface gloss, transparency and color of recorded images. The ink jet recording sheet has a gloss like photographic papers and has a high transparency, and can be used as OHP films. In this ink jet recording sheet, an ink receiving layer containing a pseudo-boehmite alumina hydrate and a binder is provided on a support, the ratio of a pore volume of the pores having a radius of 13 nm or more and less than 50 nm to a pore volume of the pores having a radius of 3 nm or more and less than 13 nm is 0.3–0.9 or the pore volume of the pores having a radius of 13 nm or more and less than 50 nm is 0.1–0.5 ml/g. Furthermore, the ink receiving layer has a surface pH of 4.0–5.4.

9 Claims, No Drawings

INK JET RECORDING SHEET

BACKGROUND OF THE INVENTION

The present invention relates to ink jet recording sheets used for printers or plotters utilizing the ink jet recording system. Particularly, it relates to ink jet recording sheets having a gloss of photographic papers which is highly demanded in color recording or to ink jet recording sheets high in transparency and usable as films for over-head projectors (OHP).

With recent remarkable progress of ink jet printers or plotters, full-color and highly minute images can be easily obtained. Accordingly, development of ink jet recording sheets other than the conventional woodfree papers and coated papers is desired earnestly.

Ink jet recording system performs recording of images or letters by ejecting ink droplets according to various principles and allowing them to adhere to recording sheets such as papers. Ink jet printers or plotters have the features that they are excellent in high-speed print-ability, produce little noise, are great in versatility of recording patterns and require no development-fixation step, and they are noticed in that complicated images can be accurately and rapidly formed. Recently, they have rapidly spread in various uses, especially, as devices for making hard copies of image information such as letters and figures produced by computers. Furthermore, multicolor recording can be easily performed by using a plurality of ink nozzles. The multicolor ink jetting systems are not inferior in the resulting records to the multicolor printing according to reprophotographic systems or printing according to color photographic systems. Moreover, when a small number of prints are to be produced, they can produce the prints more cheaply than the printing techniques or photographic techniques.

Lately, inexpensive ink jet printers are commercially available which can output highly minute images equal to the images obtained by the silver salt photographic system. Ink jet recording sheets can give images of the same quality as those produced by silver salt photographic systems while they are very cheap. Therefore, the ink jet recording sheets provide economically a great merit for users who must change frequently the display images such as advertising products or commercial samples which must have large areas. Moreover, recently, it becomes common to produce images on personal computers and correct color arrangement or layout with observing the printout. Such is utterly impossible according to the conventional silver salt photographic systems while such operation can be readily performed by the ink jet recording, which is one of the merits of the ink jet recording systems.

Thanks to these merits, ink jet printers or plotters have rapidly spread. As a result, demands for recording sheets are diversified, and, there are demanded recording sheets having excellent appearance of high surface gloss equal to silver salt color photographs and recording sheets of high transparency usable as films for OHP.

As for the recording sheets used for ink jet recording systems, efforts have been made from the side of apparatus or ink composition so that the general woodfree papers for printing or writing and coated papers can be used. However, with improvement in performances such as printing speed, minuteness of images, or full-color recording of ink jet recording apparatuses and with expansion of uses, ink jet recording sheets are also required to have the higher characteristics. These characteristics are as follows: ink dots have a high density and a light and clear color tone; ink is quickly absorbed into the recording sheets; even when an ink dot overlaps another ink dot, the ink does not flow or blot; ink dots do not diffuse in lateral direction more than needed; and ink dots have smooth and distinct perimeter lines. Especially, in the case of color recording, not only the single color recording of yellow, magenta, cyan, and black, but also overlaying recording of these colors are carried out, and the amount of ink adhering to the recording sheet is further increased and, hence, very high performances are required for the recording apparatuses.

Ink jet recording sheets using alumina hydrates are proposed as those which are high in ink absorption speed and enhanced in glossiness. That is, JP-A-5-32037, JP-A-6-297831, JP-A-7-76161, JP-A-7-232473, JP-A-7-232474, JP-A-7-232475, JP-A-9-30115, JP-A-9-86035, and JP-A-9-76628 disclose ink jet recording sheets comprise a support on which fine alumina sol is coated together with a water-soluble binder.

These ink jet recording sheets are much superior in ink absorption speed to those which use water-soluble polymer and others as an ink receiving layer and which are described in JP-A-57-38185, JP-A-60-168651 and JP-A-61-181679. However, in the case of these ink jet recording sheets which use alumina hydrates, ink is absorbed through voids between the particles, and, hence, coating amount of the ink receiving layer must be increased so as to ensure ink absorption capacity. However, increase of the coating amount of ink receiving layer makes difficult the production of recording sheets owing to increase of haze and occurrence of cracks in the coat.

Further problem of these ink jet recording sheets using alumina hydrates is that when they are stored for a long period of time in a file made of polyethylene, polypropylene or vinyl chloride resin or are allowed to contact with tapes, pastes, platen rubber rolls and others, the edge portions or the contact portions of the recording sheets yellow to considerably damage the appearance.

The reason for the yellowing is considered that the antioxidant contained in files of polyethylene or polypropylene, tape adhesives, pastes, and rubbers is adsorbed to the alumina hydrates of the ink receiving layer and oxidized on the recording sheet. Polyethylene and polypropylene often contain antioxidants having a phenol group in the molecule, such as butylhydroxytoluene. It is well known that if these phenolic antioxidants are oxidized to have a quinone structure, the yellowing occurs.

In order to overcome these problems, JP-A-6-286297, JP-A-6-316145 and JP-A-7-68920 disclose ink jet recording sheets having a porous ink receiving layer containing a chain polyvalent carboxylic acid, an organic acid having an aromatic nucleus, and a fluorescent brightener. All of them concern with improvement of discoloration due to long-term storing, but definite actions of these additives have not yet been clarified. Furthermore, if amount of these additives is too much, this causes deterioration of ink absorption and change of color tone in the printed portions, and, as a result, satisfactory color images cannot be obtained.

In addition, JP-A-7-314881 discloses an ink jet recording sheet having a porous ink receiving layer that contains at least one of urea derivatives, semicarbazide derivatives, carbohydrazide derivatives and hydrazine derivatives, and JP-A-7-314883 discloses an ink jet recording sheet having a porous ink receiving layer that contains at least one of thiourea derivatives, thiosemicarbazide derivatives and thiocarbohydrazide derivatives. They aim at improvement of discoloration caused by long-term storing, but these additives also result in deterioration of ink absorption and change of color of the printed portions if amount of them is too much, and no satisfactory color images can be obtained.

SUMMARY OF THE INVENTION

The object of the present invention is to provide an ink jet recording sheet which has excellent ink absorption speed and ink absorption capacity (hereinafter called together "ink absorption properties"), is high in surface gloss and transparency of ink receiving layer, shows no change of color tone in the printed portions and no discoloration (yellowing) of unprinted portions (background portions) with lapse of time, and produces clear color tone.

The object has been attained by the following means. That is, in an ink jet recording sheet which comprises a support and, provided thereon, an ink receiving layer containing a pseudo-boehmite alumina hydrate and a binder, high surface gloss and transparency can be obtained with having good ink absorption properties when a ratio of pore volume of pores having a radius of 13 nm or more and less than 50 nm to pore volume of pores having a radius of 3 nm or more and less than 13 nm of the ink receiving layer is in the range of 0.3–0.9. If the ratio of pore volume is less than 0.3, ink absorption properties are inferior and if it exceeds 0.9, gloss and transparency are deteriorated.

Furthermore, when the pore volume of pores having radius of 13 nm or more and less than 50 nm is in the range of 0.1–0.5 ml/g, a practically effective ink absorption capacity increases and thus an ink jet recording sheet having excellent ink absorption properties can be obtained. If the pore volume of pores having a radius of 13 nm or more and less than 50 nm is less than 0.1 ml/g, ink absorption capacity is insufficient and if it exceeds 0.5 ml/g, gloss and transparency are deteriorated.

The ink receiving layer having such pore radius and volume can be formed by adding an alkaline aqueous solution to the coating liquid for the ink receiving layer which contains a pseusoboehmite-like alumina hydrate and a binder. The alkaline aqueous solution is preferably aqueous ammonia solution or aqueous sodium hydroxide solution.

Another method for adjusting the pore radius and volume of the ink receiving layer is to add an organic solvent to the coating liquid for the ink receiving layer. Amount of the organic solvent is preferably 20–80% by weight based on the solid content of the pseudo-boehmite alumina hydrate. As the organic solvent, especially preferred is methyl alcohol, ethyl alcohol, n-propyl alcohol, isopropyl alcohol, 2-methoxyethanol, ethylene glycol or propylene glycol.

Furthermore, when the surface of the ink receiving ing layer has a pH in the range of 4.0–5.4, a clear ink jet recorded image which shows no change of color in the printed portions and no yellowing of the unprinted portions can be obtained.

As the materials which constitute the ink receiving layer, when the pseudo-boehmite alumina hydrate is in the form of plates having an average aspect ratio of 3–7 and the pore volume of pores having a radius of 3 nm or more and less than 13 nm of the alumina hydrate is 0.2 ml/g or more, and the binder is a polyvinyl alcohol having a polymerization degree of 2000 or more and a saponification degree of 88% or more and less than 100%, an ink jet recording sheet which is the best in the above characteristics can be obtained.

DETAILED DESCRIPTION OF THE INVENTION

The constitutive elements of the ink jet recording sheet of the present invention and method for producing the same will be explained in detail. The ink jet recording sheet of the present invention comprises a support and, provided thereon, a porous ink receiving layer containing mainly a pseudo-boehmite alumina hydrate and a binder. The pores present in the ink receiving layer in the present invention can be roughly classified into two. One results from the voids between primary particles of the alumina hydrate and has a pore radius of 3 nm or more and less than 13 nm. Another results from the voids between secondary articles comprising agglomerates of several to several ten primary particles and has a pore radius of 13 nm or more and less than 50 nm.

As for the pores resulting from the voids between primary particles, the distribution of the pore radius or pore volume can be controlled by changing the method for the production of the pseudo-boehmite alumina hydrate and the production conditions. The method for the production of the pseudo-boehmite alumina hydrate used in the present invention is not limited, and mention may be made of known methods, for example, hydrolysis of an aluminum alkoxide and hydrolysis of sodium aluminate. The hydrolysis of aluminum alkoxide is especially preferred.

It is preferred from the point of ink absorption properties that the pseudo-boehmite alumina hydrate synthesized by these methods is in the form of plates having an average aspect ratio of 3–7 and the pore volume of pores having a radius of 3 nm or more and less than 13 nm is 0.2 ml/g or more. It is known that alumina hydrates include those in the form of bundles (columns) having a relatively small aspect ratio and those in the form of plates having a relatively great aspect ratio. According to the inventors, knowledge, alumina hydrates in the form of plates are superior in dispersibility to the bundle-like (columnar) alumina hydrates and hardly cause cracking of the formed ink receiving layer and, besides, are excellent in film-formability. In addition, they do not damage the ink absorption properties of the ink receiving layer. On the other hand, the bundle-like alumina hydrates are apt to cause cracking of the ink receiving layer and are inferior in formability of the ink receiving layer.

As for the pores resulting from the voids between secondary particles, the means for controlling the pore radius and the pore volume include, for example, a method of changing the method of producing the pseudo-boehmite alumina hydrates and the production conditions, a method of controlling the size of secondary particles of the pseudo-boehmite alumina hydrates by agitation or vibration, and a method of controlling the degree of agglomeration by adding to the coating liquid one or more of acidic or alkaline aqueous solutions or organic solvents. Especially preferred is the method of adding alkaline aqueous solutions or organic solvents to the coating liquid.

When an alkaline aqueous solution is added to the coating liquid for controlling the radius or volume of the pores resulting from the voids between secondary particles, aqueous ammonia or aqueous sodium hydroxide solution is used preferably. Aqueous ammonia is especially preferred because it evaporates after coating and hardly remains in the ink jet recording sheet. Amount of the alkaline aqueous solution added is preferably such as to keep pH of the coating liquid at 4.5–7.0. This is because if pH exceeds 7.0, viscosity of the coating liquid considerably increases to make the coating difficult. The pH within the range of 4.5–6.0 is especially preferred for the process of coating.

The reason for the voids between secondary particles changing with the change of pH can be presumed as follows. Since the secondary particles of pseudo-boehmite alumina hydrate have a relatively flat or slender shape formed by agglomeration of the primary particles with being oriented to some extent, they have anisotropy in the properties such as isoelectric point. Therefore, the whole of the secondary particles are in the state of neutral to positive state when the pH is about 4–4.5 while when the pH exceeds 4.5, a specific face has negative charge and as a result the secondary particles form a cardhouse-like structure with each other to increase the void content.

When an organic solvent is added to the coating liquid for the purpose of controlling radius and volume of pores resulting from the voids between the secondary particles, preferred examples of the organic solvents are alcohols and glycols such as methyl alcohol, ethyl alcohol, n-propyl alcohol, isopropyl alcohol, 2-methoxyethanol, ethylene glycol, and propylene glycol, and modification products thereof. In addition, water-soluble solvents such as acetone, methyl ethyl ketone and others may also be used. Of these organic solvents, especially preferred are methyl alcohol, ethyl alcohol, n-propyl alcohol, isopropyl alcohol, 2-methoxyethanol, ethylene glycol and propylene glycol. Amount of these organic solvents added to the coating liquid is preferably 20–80% by weight based on the solid content of the pseudo-boehmite alumina hydrate contained in the coating liquid. The amount is determined considering also that the coating liquid should have a viscosity suitable for coating.

The ink receiving layer in the present invention is formed by coating on a support a coating liquid containing a pseudo-boehmite alumina hydrate and a binder. As the binder to be contained in the coating liquid for the ink receiving layer, it is preferred to use one or more binders comprising resins which are soluble in water or water/alcohol mixed solvents for the purpose of adjusting liquid properties of the coating liquid, viscosity of the coating liquid, formability of the ink receiving layer and strength of the ink receiving layer. The binder is preferably a completely or partially saponified polyvinyl alcohol from the points of compatibility with pseudo-boehmite alumina hydrate and adjustment of viscosity of the coating liquid. Especially preferred is a polyvinyl alcohol having a polymerization degree of 2000 or more and a saponification degree of 88% or more and less than 100%.

As examples of other binders, mention may be made of cellulosic binders such as methyl cellulose, methylhydroxyethyl cellulose, methylhydroxypropyl cellulose and hydroxyethyl cellulose; natural polymers or derivatives thereof such as starch and modification products thereof, gelatin and modification products thereof, casein, pullulan, gum arabic, karaya gum, and albumin; vinyl polymers such as modification products of polyvinyl alcohol, polyvinyl acetal, polyvinyl acetate, polyacrylamide, and polyvinyl pyrrolidone; latexes and emulsions such as SBR latex, NBR latex, methyl methacrylate-butadiene copolymer, and ethylene-vinyl acetate copolymer; polyethylene imine; polypropylene glycol; polyethylene glycol, and styrene-maleic anhydride copolymer.

Furthermore, in order to obtain good liquid properties upon preparation of the coating liquid for forming the ink receiving layer, it is preferred to select the binders so that the coating liquid has a viscosity of 100 cps or higher. If the viscosity of the coating liquid for the ink receiving layer is too high, it sometimes becomes difficult to coat the solution. Therefore, it is preferred to select the binders so that the coating liquid has a viscosity of 5000 cps or lower. However, even if the viscosity at room temperature is as high as exceeding the above range, the viscosity can sometimes be adjusted to the above-mentioned range by heating the coating liquid.

Amount of the binder in the ink receiving layer in the present invention is preferably 3–20% by weight (solid content), especially preferably 6–10% by weight (solid content) based on the weight of the pseudo-boehmite alumina hydrate. If the amount of the binder is small, strength of the ink receiving layer lowers, and if it is too large, ink absorption properties are sometimes damaged.

In order to obtain good ink absorption capacity, coating amount of the ink receiving layer is needed to be 20 $g/m^2$ or more, preferably 30–50 $g/m^2$ in solid content. Accordingly, the dispersion of the pseudo-boehmite alumina hydrate used for the preparation of coating liquid for the ink receiving layer desirably has a concentration of 15% by eight or more, preferably 20% by weight or more.

Various acids may be added to the dispersion of he pseudo-boehmite alumina hydrate to stabilize the dispersion. These acids include, for example, nitric acid, hydrochloric acid, hydrobromic acid, acetic acid, formic acid, ferric chloride and aluminum chloride.

In many cases, satisfactory coatability can be obtained without adding a surface active agent to the coating liquid for the ink receiving layer in producing the ink jet recording sheet of the present invention. However, a surface active agent can be added for the further improvement of the coatability or for the adjustment of ink dot diameter when the ink adheres to the ink receiving layer. The surface active agents used are preferably of nonionic type, but they may be selected optionally from any of anionic type, cationic type, nonionic type and betaine type. These may be either low molecular or high molecular ones. These surface active agents may be used each alone or in combination of two or more. Amount of the surface active agents is preferably 0.001–5% by weight, more preferably 0.01–3% by weight in solid content based on the pseudo-boehmite alumina hydrate.

The ink receiving layer may further contain known additives such as inorganic pigments, coloring dyes, coloring pigments, fixers for ink dyes, ultraviolet absorbers, antioxidants, dispersants for pigments, anti-foaming agents, leveling agents, preservatives, fluorescent brighteners, viscosity stabilizers, and pH adjustors.

Furthermore, in order to control the ink dot diameter to improve resolution of images, the ink receiving layer may contain fluorocarbon resin type, silicone resin type or alkyl ketene dimer type water repellants and sizing agents as far as they do not cause agglomeration when mixed with the dispersion of the pseudo-boehmite alumina hydrate. These water repellants and sizing agents may be those which are commercially available. These water repellants and sizing agents can be used in the form of either a solution or an aqueous emulsion. The ink dot diameter can be controlled depending on the amount of the water repellants added to the ink receiving layer. The amount which varies depending on the components, the concentration and the desired ink dot diameter is usually 0.05–10% by weight, especially preferably 0.1–5% by weight in effective solid content based on the total solid content of the ink receiving layer.

The layer construction of the ink receiving layer in the ink jet recording sheet of the present invention may be of single layer or multi-layer. In the case of the multi-layer construction, all of the layers may be those which contain pseudo-boehmite alumina hydrate and binder or some of the layers may be those which contain components other than the pseudo-boehmite alumina hydrate which include alumina hydrates of being not pseudoboehmite-like and the other layers may be those which contain the pseudo-boehmite alumina hydrate and the binder.

When the ink receiving layer comprises multilayer and all of the layers are those which contain the pseudo-boehmite alumina hydrate and binder, all of them may be the same in the composition and the characteristics or they may differ in the composition and the characteristics. For example, in the case of two-layer construction, the upper layer may have pores of larger diameter for increasing the ink absorption speed and the lower layer may have pores of smaller diameter so as to be advantageous for light transmission, whereby the ink absorption speed and the light transmission are balanced. In this way, optional layer constructions can be employed according to the purpose.

Furthermore, for increasing the ink absorption capacity, an ink receiving layer comprising a water-soluble resin such as polyvinyl alcohol or polyvinyl pyrrolidone may be provided underneath the layer containing the alumina hydrate and binder. Moreover, the ink receiving layer in the present invention may be provided on one side of a support, but may be provided on both sides of the support for the prevention of curling.

For coating the coating liquid for the ink receiving layer on the support, there may be employed conventional coating methods such as slide hopper coating method, curtain coating method, extrusion coating method, air knife coating method, roll coating method, and rod bar coating method.

As the support for the ink jet recording sheet of the present invention, there may be mainly used, for example, polyester films, resin-coated papers and coated papers. However, there are no limitations as far as the ink receiving layer containing pseudo-boehmite alumina hydrate and binder can be provided thereon. Thus, glass, aluminum foils, deposited papers, deposited films, nonwoven fabrics and clothes may also be used. Furthermore, void-containing films containing many voids in the film, such as foamed polyester films can also be used for imparting cushioning properties and hiding properties. Thickness of the support is not limited, but when a polyester film is used, that of about 10–200 μm thick is preferred from the points of handleability and sheet feed ability. Furthermore, when a resin-coated paper is used, there is also no limitation in thickness, but the thickness is preferably about 50–300 μm. However, that of about 200–300 μm thick is preferred to obtain the hand of photographic paper.

The polyesters in the polyester films used as the support are those which are obtained by polycondensation of aromatic dicarboxylic acids such as terephthalic acid, isophthalic acid, and naphthalenedicarboxylic acid or esters thereof with polyhydric alcohols such as ethylene glycol, diethylene glycol, 1,4-butanediol, and neopentyl glycol. Specific examples of the polyesters are polyethylene terephthalate, polyethylenebutylene terephthalate, polyethylene-2,6-naphthalate, and copolymers of them with other components. The polyester films are these polyesters formed into films, and usually they are subjected to orientation by roll stretching, tenter stretching, inflation stretching or the like.

The base papers used for the resin-coated papers have no limitation and can be papers which are generally used, but preferred are smooth base papers such as used for photographic supports. The pulps constituting the base papers include one or more of natural pulps, regenerated pulps and synthetic pulps. These base papers contain additives generally used for paper making, such as sizing agents, strengthening agents, loading materials, antistatic agents, fluorescent brighteners, and dyes. Furthermore, the surface of the base papers may be coated with surface sizing agents, surface strengthening agents, fluorescent brighteners, antistatic agents, dyes, anchoring agents and the like.

The coating resins for the resin-coated papers are preferably polyolefin resins, especially preferably polyethylene resin. Moreover, low-density polyethylene, medium-density polyethylene, high-density polyethylene or mixtures thereof can be used. These polyethylene resins having various densities and melt flow rates can be used each alone or in admixture of two or more. The resin layer of the resin-coated papers may be of single layer construction or multi-layer construction comprising two or more layers. In this case, the above polyolefin resins can also be used each alone or in admixture of two or more. Furthermore, the respective layers of multi-layer construction may have different compositions from each other or may have the same composition. The resin layer of multi-layer construction may be formed by co-extrusion method or sequential coating method.

The resin layer of the resin-coated papers can also be formed by coating an aqueous dispersion of resin such as a film-forming latex. For example, the resin layer can also be formed by coating an aqueous resin dispersion such as a latex having a low minimum film forming temperature (MFT) on a base paper for resin-coated papers and then heating the coat to a temperature higher than the minimum film forming temperature of the aqueous resin dispersion.

Thickness of the coated resin layer in the resin-coated papers is not limited, but in general the resin layer is provided at a thickness of 5–50 μm on only one side of the base paper on which the ink receiving layer is to be provided or on which the ink receiving layer is not to be provided, namely, the side opposite to the side on which the ink receiving layer is to be provided or on both sides of the base paper.

The coating resin of the resin-coated papers may contain, in suitable combinations, various additives, for example, white pigments such as titanium oxide, zinc oxide, talc and calcium carbonate, fatty acid amides such as stearic acid amide and arachidic acid amide, fatty acid metallic salts such as zinc stearate, zinc behenate, calcium stearate and magnesium stearate, blue pigments or dyes such as cobalt blue, ultramarine, Cerulean Blue and phthalocyanine blue, magenta pigments and dyes such as cobalt violet, fast violet and manganese violet, antioxidants such as tetrakis [methylene-3(3', 5'-di-tert-butyl-4-hydroxyphenyl) propionate]methane, fluorescent brighteners, and ultraviolet absorbers.

An anchoring layer may be provided on the support in the present invention for improving adhesion between the ink receiving layer and the support. Hydrophilic binders such as gelatin, solvent-soluble binders such as polyvinyl butyral, latexes, curing agents, pigments, surface active agents, and the like may be used for the anchoring layer in suitable combinations.

Moreover, various back coat layers can be coated on the support for giving antistatic properties, sheet feed ability, anticurl properties, writability and sizability. The back coat layer may contain, in suitable combinations, inorganic antistatic agents, organic antistatic agents, hydrophilic binders, latexes, curing agents, pigments, lubricants, surface active agents, and the like.

The ink jet recording sheet of the present invention is further characterized in that the surface pH of the ink receiving layer containing a pseudo-boehmite alumina hydrate and a binder is in the range of 4.0–5.4. Various acids can be used for giving the surface pH of 4.0–5.4. As examples of these acids, mention may be made of organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, terephthalic acid, glutaric acid, gluconic acid, lactic acid, aspartic acid, glutamic acid, pimelic acid and suberic acid, and inorganic acids such as hydrochloric acid, nitric acid and phosphoric acid. The present invention is not limited to these acids exemplified.

As the method for adding these acids, there are a method of immersing the ink receiving layer in a solution of the acid in a suitable solvent, a method of applying a solution of the acid to the ink receiving layer by spraying or the like, and a method of previously adding the acid to the materials used for forming the ink receiving layer. The present invention is not limited to these methods. Especially, the method of immersing the ink receiving layer in a solution of the acid and the method of applying the solution to the ink receiving layer by spraying or the like are preferred since the surface pH can be adjusted without causing change of pore structure of the ink receiving layer.

Amount of these acids can be determined considering the thickness of the ink receiving layer and the degree of acidity of the acids, so that the surface pH of the ink receiving layer falls within the range of 4.0–5.4. If the surface pH is lower than 4.0, the color tone of printed portions changes and good color image cannot be obtained. If it is higher than 5.4, the effect to inhibit yellowing cannot be sufficiently exhibited, and unprinted portions may yellow after storage for a long period of time. The surface pH is more preferably 4.0–4.6.

The surface pH of the ink receiving layer can be measured using a pH measurement set for paper surface (type MPC) of Kyoritsu Rikagaku Kenkyujo Co., Ltd. which corresponds to Method A (coating method) of methods for the measurement of paper surface pH specified by Japan Technical Association of the Pulp and Paper Industry(J'TAPPI).

PREFERRED EMBODIMENTS OF THE INVENTION

The present invention will be explained by the following nonlimiting examples.

Preparation of pseudo-boehmite alumina hydrate:

Commercially available aluminum isopropoxide was hydrolyzed, aged and, thereafter, deflocculated with acetic acid to obtain a dispersion of alumina hydrate. The conditions for preparation are shown in Table 1. This dispersion was once dried by a spray dryer to obtain a powder (xerogel). As a result of measurement of pore distribution of the resulting powder by mercury penetration method, both the powders prepared under conditions 1 and conditions 2 had a peak at a pore radius of about 10 nm. The pore volume of pores having a radius of 3 nm or more and less than 13 nm which were considered to result from the voids between the primary particles was 0.389 ml/g (conditions 1) and 0.212 ml/g (conditions 2). As a result of measurement of X-ray diffraction of these powders, both the powders prepared under conditions 1 and conditions 2 showed pseudo-boehmite structure. Furthermore, particle form was observed by a transmission type electron microscope to find that both were platy particles having an average length in the direction of major axis (referred to as "average particle diameter") of about 15 nm and an aspect ratio of 3.7 (conditions 1) and an average particle diameter of about 14 nm and an aspect ratio of 6.2 (conditions 2), respectively.

TABLE 1

| Conditions | Conditions 1 | Conditions 2 |
|---|---|---|
| Aging temperature (° C.) | 95 | 95 |
| Aging time (hr) | 20 | 5 |
| Deflocculation temperature (° C.) | 95 | 95 |
| Deflocculation time (hr) | 10 | 10 |

80 parts by weight of deionized water was added to 20 parts by weight of the above powders to re-disperse the powders, thereby to obtain a dispersion of pseudo-boehmite alumina hydrate which had a solid content of 20% by weight.

EXAMPLE 1

5 parts by weight of isopropyl alcohol and 16 parts by weight of 10 wt% aqueous solution of polyvinyl alcohol MA-23 (having a saponification degree of 97% and a polymerization degree of 2300 manufactured by Shin-Etsu Chemical Co., Ltd,) were added successively to 100 parts by weight of a dispersion (20% by weight in solid content) of the pseudo-boehmite alumina hydrate prepared under the conditions 1 to obtain a coating liquid. Addition of isopropyl alcohol was performed dropwise with stirring the dispersion. This coating liquid was coated on a transparent PET film of 100 $\mu$m thick by a bar coater so as to give a dry coating amount of 35 g/m$^2$, and dried at 80° C., followed by subjecting to a heat treatment at 140° C. for 1 minute, thereby obtaining an ink jet recording sheet of Example 1.

EXAMPLE 2

An ink jet recording sheet of Example 2 was obtained in the same manner as in Example 1, except that 5 parts by weight of 2-methoxyethanol was used in place of 5 parts by weight of isopropyl alcohol used in Example 1.

EXAMPLE 3

An ink jet recording sheet of Example 3 was obtained in the same manner as in Example 1, except that 12 parts by weight of ethylene glycol was used in place of 5 parts by weight of isopropyl alcohol used in Example 1.

EXAMPLE 4

An ink jet recording sheet of Example 4 was obtained in the same manner as in Example 1, except that 12 parts by weight of propylene glycol was used in place of 5 parts by weight of isopropyl alcohol used in Example 1.

EXAMPLE 5

An ink jet recording sheet of Example 5 was obtained in the same manner as in Example 1, except that 16 parts by weight of propylene glycol was used in place of 5 parts by weight of isopropyl alcohol used in Example 1.

EXAMPLE 6

16 parts by weight of 10 wt % aqueous solution of polyvinyl alcohol MA-23 and 5 parts by weight of 0.1% aqueous ammonia were added successively to 100 parts by weight of a dispersion (20% by weight in solid content) of the pseudo-boehmite alumina hydrate prepared under the conditions 1 to obtain a coating liquid. Addition of the aqueous ammonia was carried out dropwise with stirring the dispersion. This coating liquid had a pH of 4.3 before the addition of aqueous ammonia and a pH of 5.2 after the addition of aqueous ammonia. This coating liquid was coated on a transparent PET film of 100 μm thick by a bar coater so as to give a dry coating amount of 35 g/m$^2$, and dried at 80° C., followed by subjecting to a heat treatment at 140° C. for 1 minute, thereby obtaining an ink jet recording sheet of Example 6.

EXAMPLE 7

An ink jet recording sheet of Example 7 was obtained in the same manner as in Example 6, except that 20 parts by weight of 0.1% aqueous ammonia was used in place of 5 parts by weight of 0.1% aqueous ammonia used in Example 6. The coating liquid after the addition of aqueous ammonia had a pH of 6.3.

EXAMPLE 8

An ink jet recording sheet of Example 8 was obtained in the same manner as in Example 6, except that 20 parts by weight of 0.2% aqueous ammonia was used in place of 5 parts by weight of 0.1% aqueous ammonia used in Example 6. The coating liquid after the addition of aqueous ammonia had a pH of 6.3.

EXAMPLE 9

An ink jet recording sheet of Example 9 was obtained in the same manner as in Example 1, except that 100 parts by weight of a dispersion (20% by weight in solid content) of the pseudo-boehmite alumina hydrate prepared under the conditions 2 was used in place of 100 parts by weight of the dispersion (20% by weight in solid content) of the pseudo-boehmite alumina hydrate prepared under the conditions 1.

Comparative Example 1

An ink jet recording sheet of Comparative Example 1 was obtained in the same manner as in Example 1, except that the isopropyl alcohol used in Example 1 was not added.

Comparative Example 2

An ink jet recording sheet of Comparative Example 2 was obtained in the same manner as in Example 1, except that 2 parts by weight of propylene glycol was used in place of 5 parts by weight of isopropyl alcohol used in Example 1.

Comparative Example 3

An ink jet recording sheet of Comparative Example 3 was obtained in the same manner as in Example 1, except that 20 parts by weight of propylene glycol was used in place of 5 parts by weight of isopropyl alcohol used in Example 1.

Comparative Example 4

An ink jet recording sheet of Comparative Example 4 was obtained in the same manner as in Example 6, except that 20 parts by weight of 0.3% aqueous ammonia was used in place of 5 parts by weight of 0.1% aqueous ammonia used in Example 6. The coating liquid after the addition of aqueous ammonia had a pH of 7.2.

Comparative Example 5

An ink jet recording sheet of Comparative Example 5 was obtained in the same manner as in Example 1, except that 100 parts by weight of a dispersion (20% by weight in solid content) of the pseudo-boehmite alumina hydrate prepared under the conditions 2 was used in place of 100 parts by weight of the dispersion (20% by weight in solid content) of the pseudo-boehmite alumina hydrate prepared under the conditions 1 and the isopropyl alcohol used in Example 1 was not added.

Comparative Example 6

An ink jet recording sheet of Comparative Example 6 was obtained in the same manner as in Example 1, except that a commercially available pseudo-boehmite alumina hydrate (CATALLOID AS-3 manufactured by Catalysts and Chemicals Ind. Co., Ltd., having a volume of the pores of 0.712 ml/g which had a radius in the range of 3 nm or more and less than 13 nm and having an aspect ratio of 1.2) was used in place of the pseudo-boehmite alumina hydrate prepared under the conditions 1.

Comparative Example 7

An ink jet recording sheet of Comparative Example 7 was obtained in the same manner as in Example 1, except that a commercially available pseudo-boehmite alumina hydrate (NANOWHISKER manufactured by Sato Research Co., Ltd., having a volume of the pores of 0.298 ml/g which had a radius in the range of 3 nm or more and less than 13 nm and having an aspect ratio of 8.1) was used in place of the pseudo-boehmite alumina hydrate prepared under the conditions 1.

Pore distributions of the ink receiving layers of the above ink jet recording sheets measured by mercury penetration method are shown in Table 2. Autopore II 9220 manufactured by Micromeritics Co., Ltd. was used for the measurement.

TABLE 2

| Samples | Pore volume (1) (3 nm or more and less than 13 nm) | Pore volume (2) (13 nm or more and less than 50 nm) | (2)/(1) |
|---|---|---|---|
| Example 1 | 0.388 ml/g | 0.124 ml/g | 0.32 |
| Example 2 | 0.380 | 0.256 | 0.67 |
| Example 3 | 0.395 | 0.281 | 0.71 |
| Example 4 | 0.392 | 0.308 | 0.79 |
| Example 5 | 0.393 | 0.342 | 0.87 |
| Example 6 | 0.393 | 0.342 | 0.87 |
| Example 7 | 0.390 | 0.382 | 0.98 |
| Example 8 | 0.396 | 0.475 | 1.20 |
| Example 9 | 0.235 | 0.088 | 0.37 |
| Comparative Example 1 | 0.386 | 0.024 | 0.06 |
| Comparative Example 2 | 0.384 | 0.042 | 0.11 |
| Comparative Example 3 | 0.398 | o.510 | 1.28 |
| Comparative Example 4 | 0.390 | 0.520 | 1.33 |
| Comparative Example 5 | 0.210 | 0.019 | 0.09 |
| Comparative Example 6 | 0.679 | 0.080 | 0.12 |
| Comparative Example 7 | 0.320 | 0.084 | 0.26 |

Evaluation 1: Ink absorption properties:

Printing was carried out using commercially available two ink jet printers (PM-700C manufactured by Seiko-Epson Co., Ltd. and BJC-420J manufactured by Canon, Inc.), and ink absorption properties were evaluated. When the solid printed portion was uniform, this is indicated by "○"; when some unevenness was seen, but caused no practical problems, this is indicated by "Δ"; and when ink overflowed and the solid printed portion was non-uniform, this is indicated by "X". The results are shown in Table 3.

Evaluation 2: Gloss at 60°:

For measurement of specular gloss at 60°, samples of the ink jet recording sheets were prepared by replacing the transparent PET film used as a support with a white PET film in the above examples and comparative examples. The gloss of the unprinted portion of the samples was measured by VGS-300A manufactured by Nihon Denshoku Kogyo Co., Ltd. The specular gloss at 60° is preferably 70 or more, and when it is 80 or more, a gloss of high-grade feeling is obtained. The results are shown in Table 3.

Evaluation 3: Haze:

Haze of the unprinted portion of samples having the transparent PET film as a support was measured using NDH-300A manufactured by Nihon Denshoku Kogyo Co., Ltd. When the haze is less than 10, the ink jet recording sheet can be used for over-head projectors. The results are shown in Table 3.

TABLE 3

| Samples | Ink absorption properties | Specular gloss at 60° | Haze |
|---|---|---|---|
| Example 1 | ○ | 83 | 6.3 |
| Example 2 | ○ | 81 | 6.8 |
| Example 3 | ○ | 88 | 5.4 |
| Example 4 | ○ | 85 | 5.7 |
| Example 5 | ○ | 81 | 7.4 |
| Example 6 | ○ | 80 | 7.2 |
| Example 7 | ○ | 80 | 7.7 |
| Example 8 | ○ | 78 | 8.6 |
| Example 9 | Δ | 89 | 5.3 |
| Comparative Example 1 | X | 85 | 5.7 |
| Comparative Example 2 | X | 89 | 5.7 |
| Comparative Example 3 | ○ | 61 | 11.3 |
| Comparative Example 4 | ○ | 57 | 12.1 |
| Comparative Example 5 | X | 88 | 5.2 |
| Comparative Example 6 | X | 81 | 6.7 |
| Comparative Example 7 | X | 72 | 9.4 |

The ink jet recording sheets of Examples 1–8 and Comparative Examples 1–4 which were produced using pseudo-boehmite alumina hydrate (aspect ratio: 3.7 and pore volume of the pores of 3 nm or more and less than 13 nm in pore radius: 0.389 ml/g) prepared under the conditions 1 had nearly the same pore volume (1) of 3 nm or more and less than 13 nm in pore radius. Those of Example 9 and Comparative Example 5 which were made using pseudo-boehmite alumina hydrate (aspect ratio: 6.2 and pore volume of the pores of 3 nm or more and less than 13 nm in pore radius: 0.212 ml/g) prepared under the conditions 2 had also nearly the same pore volume (1). It can be seen from the results that the pore volume (1) of the pores in the range of 3 nm or more and less than 13 nm in pore radius which are considered to result from the voids between primary particles was not affected by the addition of alkaline aqueous solution or organic solvent. When further taking into consideration the results of Comparative Examples 6 and 7 which used pseudo-boehmite alumina hydrates having an aspect ratio of 1.2 and 8.1, respectively, the pore volume (1) was greatly affected by the form of the primary particles of the alumina hydrate. On the other hand, the pore volume (2) of the pores in the range of 13 nm or more and less than 50 nm in pore radius which are considered to result from the voids between secondary particles was greatly affected by the addition of alkaline aqueous solution or organic solvent.

In the ink jet recording sheets of Examples 1–9, the pore volume ratio (2)/(1) of the ink receiving layer was in the range of 0.3–0.9 or the pore volume (2) was in the range of 0.1–0.5 ml/g. As can be seen from Table 3, these ink jet recording sheets all had good ink absorption properties, surface gloss and transparency. The ink jet recording sheet of Example 8 appeared to be somewhat cloudy, but had practically no problems even when used as films for OHP. The ink jet recording sheet of Example 9 was somewhat inferior in ink absorption properties to those of Examples 1–8, but had practically no problems.

The ink jet recording sheet of Comparative Example 5 considered to be insufficient in absolute pore volume was the worst in ink absorption properties. The ink jet recording sheets of Comparative Examples 1, 2 and 7 were insufficient in the pore volume (2) of the pores of 13 nm or more and less than 50 nm in pore radius, and, hence, were inferior in ink absorption properties. The ink jet recording sheet of Comparative Example 6 was poor in ink absorption properties probably because it was great in the pore volume (1) of the pores of 3 nm or more and less than 13 nm in pore radius, but was small in the pore volume (2). On the other hand, the ink jet recording sheets of Comparative Examples 3 and 4 were good in ink absorption properties, but inferior in specular gloss at 60° and haze. When haze is increased, the formed color of the ink jet record appears dull, and, therefore, the ink jet recording sheet was not satisfactory also when an opaque white PET was used as a support.

EXAMPLES 10–14

The ink jet recording sheets of Example 2 were subjected to acid treatment by immersing them in ethanolic solutions of maleic acid differing in concentration and air-dried. Then, the ink jet recording sheets were heat dried at 140° C. for 3 minutes by a hot-air dryer to obtain an ink jet recording sheet of Example 10 (maleic acid concentration used for the acid treatment: 0.002 mol/l), that of Example 11 (the maleic acid concentration: 0.02 mol/l), that of Example 12 (the maleic acid concentration: 0.05 mol/l), that of Example 13 (the maleic acid concentration: 0.1 mol/l), and that of Example 14 (the maleic acid concentration: 0.2 mol/l) which were different in surface pH.

EXAMPLES 15–18

An ink jet recording sheet of Example 15 (sulfuric acid concentration used for the acid treatment: 0.002 mol/l), that of Example 16 (the sulfuric acid concentration: 0.02 mol/l), that of Example 17 (the sulfuric acid concentration: 0.05 mol/l), and that of Example 18 (the sulfuric acid concentration: 0.1 mol/l) which were different in surface pH were obtained using the ink jet recording sheets of Example 2 in the same manner as in Examples 10–14, except that the acid treatment was carried out using aqueous sulfuric acid solutions differing in concentration in place of the ethanolic solution of maleic acid used in Examples 10–14.

Evaluation 4: pH:

The surface pH of the ink receiving layer of the above ink jet recording sheets was measured by using a pH measurement set for paper surface (Type MPC manufactured by Kyoritsu Rikagaku Kenkyujo Co., Ltd.). The results are shown in Table 4.

Evaluation 5: Change in color tone of printed portion:

Solid printing was carried out on the ink jet recording sheets of Examples 10–18 with yellow ink, magenta ink, and cyan ink by an ink jet recording apparatus (BJC-600J manufactured by Canon, Inc.). L*a*b* (color specification according to CIE) of the portion printed with cyan ink in which the change in color tone due to the change in the surface pH is most readily appreciable was measured by a differential calorimeter (ND-1001DP manufactured by Nihon Denshoku Kogyo Co., Ltd.). The difference in color tone from that of the portion printed with cyan ink on the ink jet recording sheet of Example 2 which was not subjected to the acid treatment was evaluated in terms of color difference Δ E*ab. The smaller value indicates less change in color tone, and it is especially preferred that Δ E*ab is 1.0 or less. When Δ E*ab was 1.0 or less, this is shown by "○", when Δ E*ab was more than 1 and 2 or less, this is shown by "Δ", and when Δ E*ab was more than 2, this is shown by "X". The results are shown in Table 4.

Evaluation 6: Change in color (yellowing) of unprinted portion (background portion):

The ink jet recording sheet of Examples 10–18 was put in a commercially available polypropylene file bag (A4 size) and this was left to stand in a room for 1 month. Then, the recording sheet was taken out, and L*a*b* of the ink jet recording sheet before and after left to stand was measured by a differential calorimeter. The degree of yellowing is expressed by the difference in b* (Δb*) before and after left to stand. The smaller value means less yellowing. When Δb* was 3 or less, this is indicated by "○", when Δb* was 3–5, this is indicated by "Δ", and when Δb* was more than 5, this is indicated by "X". The results are shown in Table 4.

Evaluation 7: Image density:

Solid printing was carried out on the ink jet recording sheets of Examples 10–18 with black ink using the above ink jet recording apparatus. Optical transmission density of the printed portion was measured by Macbeth densitometer (TR1224 manufactured by Macbeth Co., Ltd.). The optical density was 1.80–1.90 in all of the ink jet recording sheets of Examples 10–18, and thus they all gave satisfactory image density.

Evaluation 8: Ink absorption properties:

Overlaying printing was performed on the ink jet recording sheets with cyan ink and magenta ink using the above ink jet recording apparatus, and the perimeter portion between the printed portion and the unprinted portion was visually evaluated by the following criteria. When no blotting occurred in the perimeter portion, this is indicated by "○", when blotting slightly occurred in the perimeter portion, but caused no practical problems, this is indicated by "Δ", and when blotting occurred in the whole of the perimeter portion, this is indicated by "X". The criterion "○" or "Δ" must be satisfied for satisfactory ink absorption properties.

TABLE 4

| | Surface pH | Change of color tone ΔE*ab | Yellowing Δb* | Ink absorption properties |
|---|---|---|---|---|
| Example 10 | 5.6~5.8 | 0.15○ | 4.76 Δ | ○ |
| Example 11 | 5.0~5.2 | 0.59○ | 2.88○ | ○ |
| Example 12 | 4.2~4.4 | 0.78○ | 1.40○ | ○ |
| Example 13 | 3.4~3.6 | 1.42Δ | 1.03○ | ○ |
| Example 14 | <2.4 | 3.26 X | 0.51○ | ○ |

TABLE 4-continued

| | Surface pH | Change of color tone ΔE*ab | Yellowing Δb* | Ink absorption properties |
|---|---|---|---|---|
| Example 15 | 5.8~6.0 | 0.16○ | 4.89Δ | ○ |
| Example 16 | 5.2~5.4 | 0.60○ | 2.82○ | ○ |
| Example 17 | 4.0~4.2 | 0.79○ | 1.82○ | ○ |
| Example 18 | 3.4~3.6 | 1.86Δ | 1.05○ | ○ |

As shown in Table 4, among the acid-treated ink jet recording sheets, the ink jet recording sheets of Examples 11, 12, 16 and 17 which had a surface pH of the ink receiving layer of 4.0–5.4 gave clear ink jet recorded images with no change in color tone of the printed portion and no yellowing of the unprinted portion and with maintaining ink absorption properties.

The ink jet recording sheets of the present invention are high in surface gloss and transparency of ink receiving layer with having excellent ink absorption speed and ink absorption capacity. Clear ink jet recorded images with no change of color tone in the printed portion and no yellowing of the unprinted portion with lapse of time can be obtained by adjusting the surface pH of the ink receiving ing layer. Thus, the ink jet recording sheets of the present invention can be used as those which have photographic paper-like gloss or those which are high in transparency and can be used as films for OHP.

What is claimed is:

1. An ink jet recording sheet comprising a support and, provided thereon, an ink receiving layer containing a psuedo-boehmite alumina hydrate a binder wherein the ratio of pore volume of the pores having a radius of 13 nm or more and less than 50 nm to that of the pores having a radius of 3 nm or more and less than 13 nm of the ink receiving layer is 0.3–0.9, and the ink receiving layer has a surface pH of 4.0–5.4.

2. An ink jet recording sheet according to claim 1, wherein the pseudo-boehmite alumina hydrate is in the form of plates having an average aspect ratio of 3–7 and the pore volume of the pores having a radius of 3 nm or more and less than 13 nm of the alumina hydrate is 0.2 ml/g or more.

3. An ink jet recording sheet according to claim 2, wherein the binder is a polyvinyl alcohol having a polymerization degree of 2000 or more and a saponification degree of 88% or more and less than 100%.

4. An ink jet recording sheet comprising a support and, provided thereon, an ink receiving layer containing a pseudo-boehmite alumina hydrate and a binder wherein the pore volume of pores having a radius of 13 nm or more and less than 50 nm of the ink receiving layer is 0.1–0.5 ml/g and wherein the ink receiving layer has a surface pH of 4.0–5.4.

5. An ink jet recording sheet according to claim 4, wherein the pseudo-boehmite alumina hydrate is in the form of plates having an average aspect ratio of 3–7 and the pore volume of the pores having a radius of 3 nm or more and less than 13 nm of the alumina hydrate is 0.2 ml/g or more.

6. An ink jet recording sheet according to claim 5, wherein the binder is a polyvinyl alcohol having a polymerization degree of 2000 or more and a saponification degree of 88% or more and less than 100%.

7. A method for producing an ink jet recording sheet according to claim 1 which comprises coating a coating liquid containing a pseudo-boehmite alumina hydrate and a binder on a support and drying the coat to form an ink receiving layer wherein an alkaline aqueous solution or an organic solvent in an amount of 20–80% by weight based on solid content of the pseudo-boehmite alumina hydrate as added to the coating liquid.

8. A method according to claim 7, wherein the alkaline aqueous solution is an aqueous ammonia solution or an aqueous sodium hydroxide solution.

9. A method according to claim 7, wherein the organic solvent is methyl alcohol, ethyl alcohol, n-propyl alcohol, isopropyl alcohol, 2-methoxyethanol, ethylene glycol or propylene glycol.

* * * * *